Nov. 25, 1924.
D. B. HALL
1,516,529
PORTABLE HANDSAW
Filed Jan. 18, 1924    2 Sheets-Sheet 1
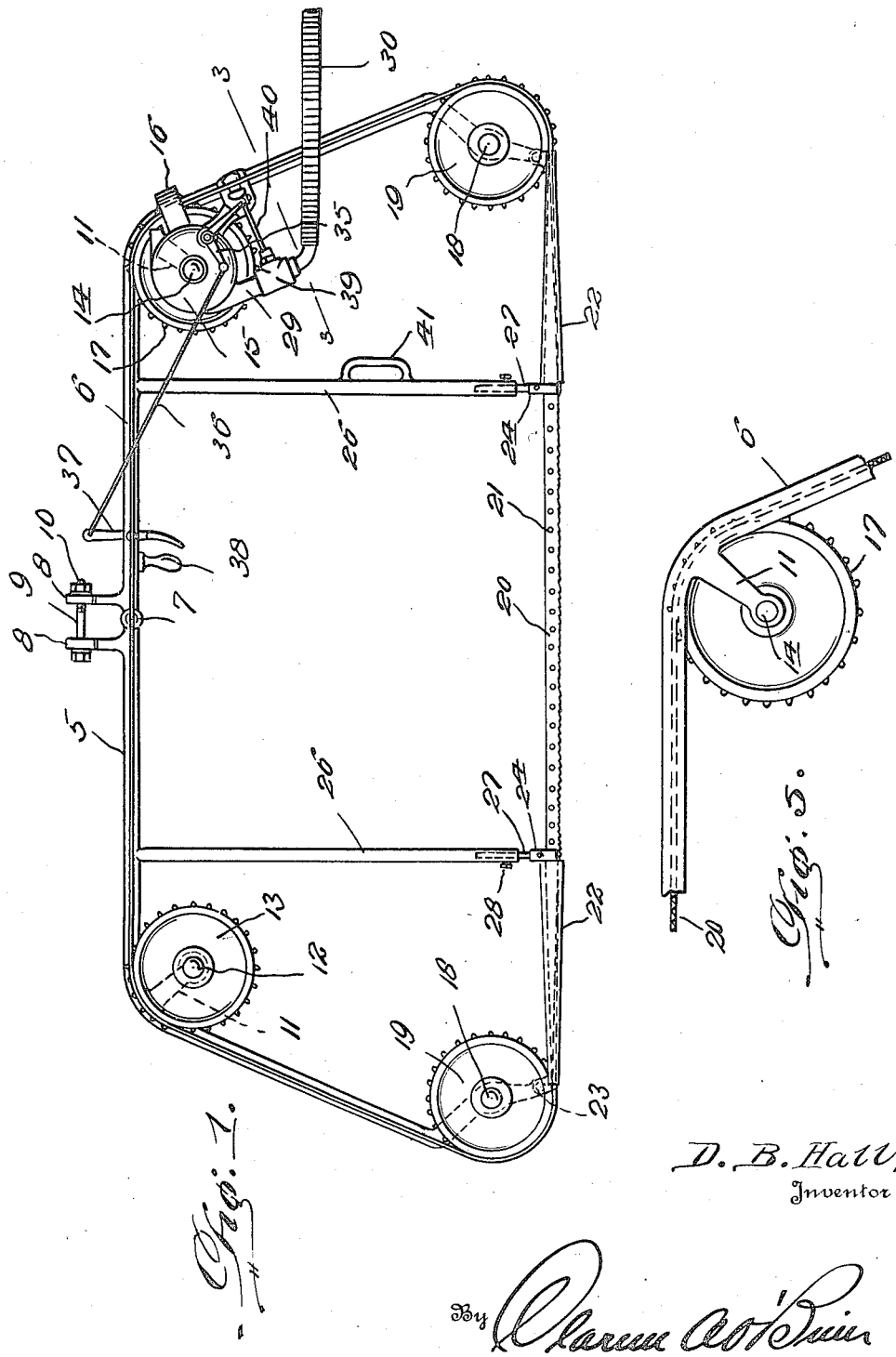

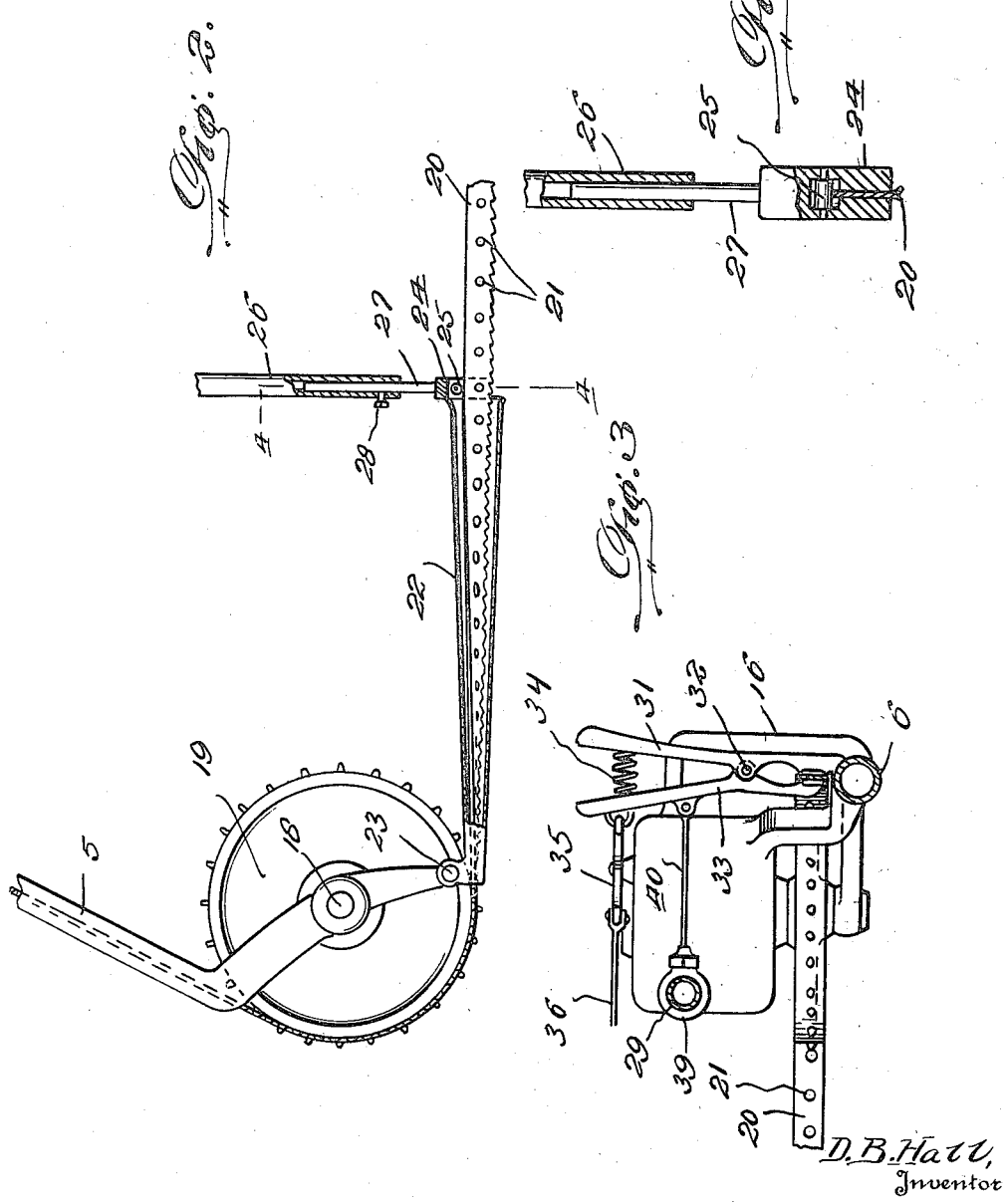

Patented Nov. 25, 1924.

1,516,529

UNITED STATES PATENT OFFICE.

DUNCAN B. HALL, OF NORTH NEW PORTLAND, MAINE.

PORTABLE HANDSAW.

Application filed January 18, 1924. Serial No. 687,026.

*To all whom it may concern:*

Be it known that I, DUNCAN B. HALL, citizen of the United States, residing at North New Portland, in the county of Somerset and State of Maine, have invented certain new and useful Improvements in Portable Handsaws, of which the following is a specification.

This invention relates to buck saws and has particular reference to a saw of this kind embodying a frame provided with means for supporting and driving a continuous saw band, the driving means being power operated, whereby reciprocation of the saw as practice with conventional forms of buck saws for effecting the sawing operation is rendered unnecessary and the sawing operation greatly facilitated with a resultant reduction in the expenditure of manual labor heretofore necessary in the operation of buck saws.

An object of the invention is to provide a buck saw having the above characteristics and embracing the desired qualities of simplicity and durability of construction as well as efficiency in operation, so as to meet with all of the requirements for a successful commercial use.

A further object of the invention is to provide simple and effective means for readily rendering the driving means inoperative and simultaneously stopping the travelling movement of the saw band whereby the travelling movement of the saw band may be instantaneously prevented to prevent breakage of said band in an emergency.

Other objects are to provide means for relatively extending the frame so as to maintain the saw band in a taut condition, and to adjust saw guides of the device in accordance with the expanded adjustment of the frame so that the exposed portion of the saw band will be maintained in proper working condition and position.

With above general objects in view and others that will become apparent as the nature of the invention is better understood, the same consists in the novel form, combination, and arrangement of parts hereinafter more fully described, shown in the accompanying drawings and claimed.

In the drawings, wherein like reference characters indicate corresponding parts throughout the several views:

Figure 1 is a side elevational view of a buck saw constructed in accordance with the present invention.

Figure 2 is an enlarged fragmentary view showing a lower corner portion of the device shown in Figure 1, partly in side elevation and partly in longitudinal section.

Figure 3 is an enlarged fragmentary sectional view, taken substantially upon the line 3—3 of Figure 1.

Figure 4 is a view similar to Figure 3 taken substantially upon the line 4—4 of Figure 2, and Figure 5 is a view somewhat similar to Figure 2 showing an upper corner portion of the device.

Referring more in detail to the drawings, the present invention embodies an inverted substantially C-shaped frame that may be of tubular form and composed of similar half sections 5 and 6, the adjacent ends of which are pivotally connected as at 7 whereby said sections may be swung toward or away from each other about said pivots for expanding or contracting the frame to adapt the same to the particular size of the band saw to be employed as will be apparent, slight variations in the sizes of said saw bands being thus taken care of. For maintaining the frame in any desired adjusted expanded condition, suitable means may be provided such as upwardly extended ears or arms 8 rigid with the adjacent pivotally connected ends of the frame sections 5 and 6 and through which is positioned a bolt 9 having a nut 10 threaded thereon at the outer side of one of said arms 8. By threading the nut 10 onto the bolt 9, it is obvious that expansion of the frame may be effected.

The saw frame is provided at its upper corners with depending and downwardly converging arms 11, in the lower end of one of which is attached a stub shaft 12 having a sprocket wheel 13 suitably secured and journalled thereon, the other arm 11 having the power shaft 14 of a rotary motor 15 journalled therein. The motor 15 is suitably rigidly carried by the frame at this point through the provision of a mounting arm or bracket 16, and fixed upon the power shaft 14 of the motor 15 is another sprocket wheel 17. Fixed to and projecting laterally from the lower corner portions of the saw frame are further stub shafts 18 upon which are suitably journalled and retained the sprocket wheels 19 that are similar to the sprocket wheels 13 and 17, and around these several sprocket wheels an endless saw band 20 is passed, said band being provided with sprocket openings 21 into which the teeth of the sprocket wheels are adapted to project for positively maintaining the saw band upon said sprocket wheels and for causing positive driving of the same.

At the lower portion of the frame, the saw band 20 passes through tubular guiding arms 22, the outer ends of which are pivotally connected to the free ends of the frame sections 5 and 6 as at 23 for swinging movement in the plane of the frame, and the inner ends of which are disposed in aligned spaced relation so as to expose a portion of the lower strand of the saw band for effecting the cutting or sawing operation. It will be noted from the several views that the saw band passes flatly around the peripheries of the several sprocket wheels and is disposed so that its cutting teeth are presented toward the adjacent side of the frame to minimize the chances of injury to the operator in an obvious manner. In order to cause disposition of the exposed portion of the saw band in a vertical plane or in the plane of the frame with the saw teeth presented at the lower edge of the band saw at this point, suitable guiding elements 24 are provided upon the inner ends of the tubular guiding arms 22, which guiding elements cause twisting of the saw bands between the inner ends of the guides 22 and embody anti-friction elements 25 adapted to engage the upper smooth end of the saw band for insuring its free traveling movement therethrough.

Vetrical rods 26 are rigid with and depend from the frame sections 5 and 6 at opposite sides of their hinged connection at 7, and upwardly projecting rods 27 that are rigid with the guiding elements 24 are slidably telescoped into the lower ends of the rods 26 and adapted to be impinged by said screws 28 threaded through the lower ends of the latter for permitting adjustment of the tubular guiding arms 22 so that the same may be truly aligned after the frame has been adjusted by expansion or contraction of the sections 5 and 6 thereof. This construction also provides means of an adjustable nature for supporting and attaching the inner ends of the arms 22 to the frame sections.

The motor 15 is preferably of the rotary compressed air operated type having an intake pipe 29 adapted to be connected with any suitable source of compressed air by means of a flexible conduit 30 that may be of any desired or required length for rendering it unnecessary to have a portable air compressing and storing unit. An arm 31 is rigid with and projects laterally from the frame section 6 adjacent the motor 15, and pivoted as at 32 between its ends to the arm 31 is a brake lever 33 having a shoe upon its inner end adapted to engage the inner surface of the saw band 20 for retarding or preventing its travelling movement until said lever is released from the saw band. The lever 33 is normally moved to braking position by means of a compression spring 34 interposed between the outer end of the arm 31 and lever 33 and pivoted to the casing of the motor 15 is a bell crank lever 35, one arm of which is attached to the outer end of the lever 33 and the other arm of which is connected by means of an operating rod or link 36 with the upper end of a hand lever 37 that is pivoted to the frame section 6 adjacent the pivotal connection 7 and adjacent a depending rigid handle or hand grip 38 carried by said frame section 6. The intake pipe 29 of the motor 15 is provided with a controlling valve 39, the movable element of which is provided with a stem 40 having its outer end connected to the lever 33 so that when the brake lever 33 is applied for engaging the saw band the supply of compressed air is cut off from the motor. It will thus be seen that under normal conditions, the operation of the motor is prevented and travelling movement of the saw band resisted by the brake lever, while upon pressing the lower end of the hand lever 37 toward the hand grip 38, the brake lever 33 will be released and the valve 39 opened so as to permit or cause operation of the motor 15 and permit travelling movement of the saw band. It is thus apparent that, immediately upon release of the hand lever 37, the spring 34 will apply the brake and cut off the supply of compressed air so as to abruptly stop the travelling movement of the saw band as is sometimes found quite necessary, for preventing breakage or damage of parts during a sawing operation. The rod 26 nearest the motor 15 may be provided with a hand hold 41, adapted to be grasped by the operator so as to assist in placing and steadying the jaw, the operator using his other hand for grasping the hand grip 38 and manipulating the hand lever 37.

A buck saw constructed in accordance with the above will be easy to operate and will eliminate the arduous labor of causing reciprocation of ordinary buck saws embodying stationary saw blades. The construction is extremely durable and may be manufactured and marketed at a low cost, as well as cheaply maintained in working order.

Minor changes may be made without departing from the spirit and scope of the invention as claimed, and it is believed that the construction and operation as well as the advantages of the device will be readily apparent to those skilled in the art.

What I claim as new is:

In a buck saw, a frame, having upper and lower sprocket wheels mounted at the ends thereof, power operated means for driving one of said sprocket wheels, an endless saw band passing around the sprocket wheels and having sprocket openings therein, guiding elements supported in spaced relation by and between the lower free ends of the same for exposing a portion of the saw band therebetween and for maintaining certain exposed portions of the saw band at right angles to the remaining portion thereof and in the plane of the frame, a normally applied brake lever for preventing movement of the saw band, a controller for the power operated driving means normally rendering the latter inoperative, and means manually operable for simultaneously operating said controller and said brake lever to render the power operated driving means operable and to render the brake lever inoperative.

In testimony whereof I affix my signature.

DUNCAN B. HALL.